July 6, 1948.    J. J. DOUCETTE    2,444,596
REVERSIBLE PIPE BENDER WITH DETACHABLE
SIDE ABUTMENT MEMBER
Filed Nov. 15, 1945    2 Sheets-Sheet 1
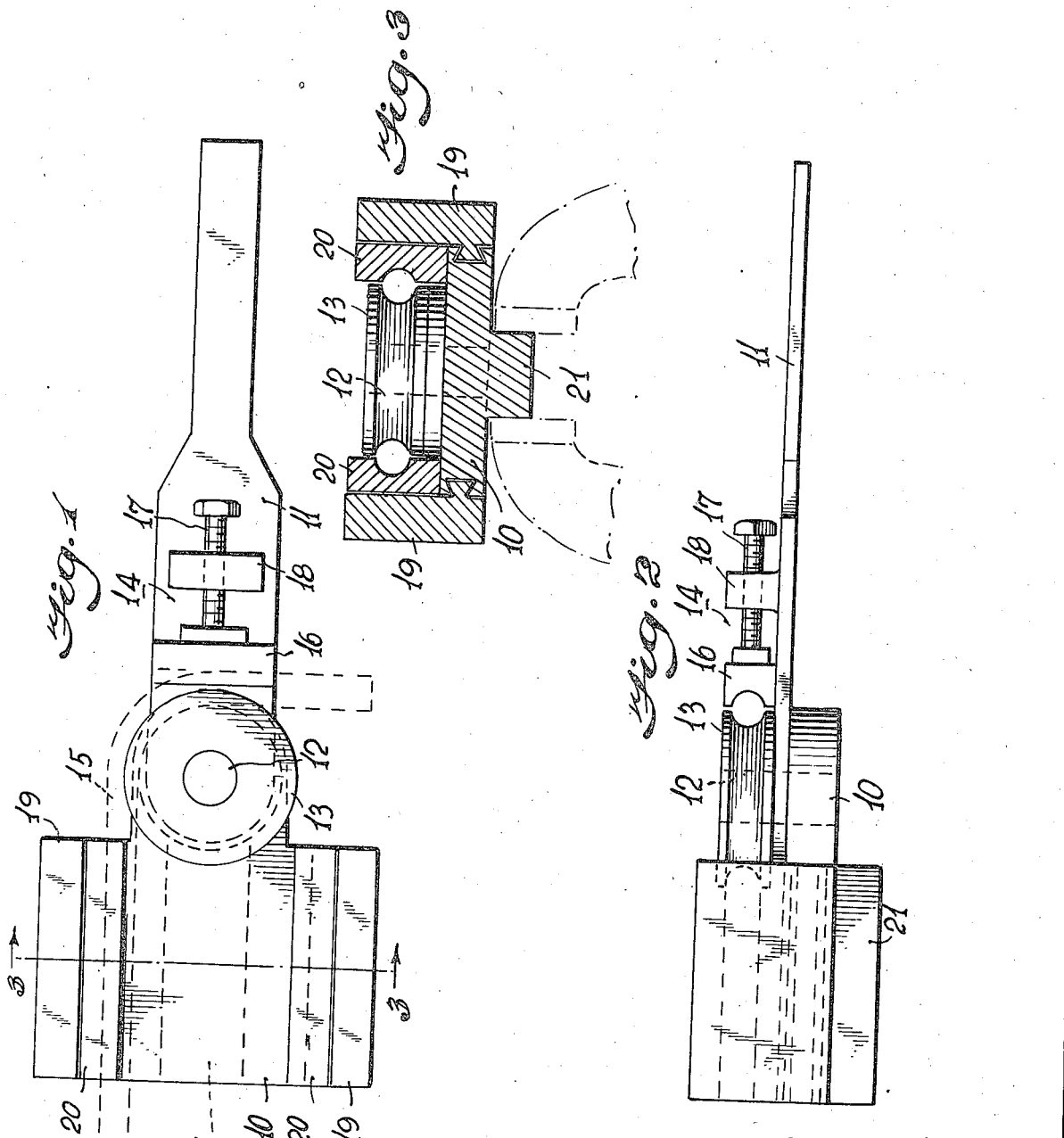
Inventor
John J. Doucette,
By William I. Geier
Attorney Inventor
John J. Doucette,
By William ...
Attorney Patented July 6, 1948

2,444,596

UNITED STATES PATENT OFFICE 2,444,596

REVERSIBLE PIPE BENDER WITH DETACHABLE SIDE ABUTMENT MEMBER

John J. Doucette, Malden, Mass.

Application November 15, 1945, Serial No. 628,696

3 Claims. (Cl. 153—40)

This invention relates to pipe or rod bending machines, and has for its general object to provide a pipe or rod bending machine of simple, practical, rugged construction which is easy to operate and thoroughly reliable and efficient in use.

The machine is of the type comprising a lever arm, a wheel, means carried by the lever arm for clamping a pipe or rod against the wheel, and an abutment for holding the pipe or rod against outward movement relative to the wheel, whereby the pipe or rod is wrapped or bent about the wheel in response to swinging of the lever arm, and in this connection particular objects of the invention are: to construct the machine so that it may readily and easily be mounted in a bench vise, to mount the abutment for movement with the pipe or rod as the latter is being bent so as to avoid scarring of the same, and to provide for adjusting the abutment inwardly and outwardly relative to the wheel to adapt the machine to operate upon pipes or rods of different diameters.

With the foregoing and other objects in view, which will become more fully apparent as the nature of the invention is better understood, the same consists in a pipe or rod bending machine embodying the novel features of construction, combination and arrangement of parts as will be hereinafter more fully described, illustrated in the accompanying drawings and defined in the appended claims.

In the accompanying drawings, wherein like characters of reference denote corresponding parts in related views:

Fig. 1 is a top plan view of a machine constructed in accordance with one practical embodiment of the invention.

Fig. 2 is a side elevation of the machine shown in Fig. 1.

Fig. 3 is a transverse section on the line 3—3 of Fig. 1.

Figure 4:
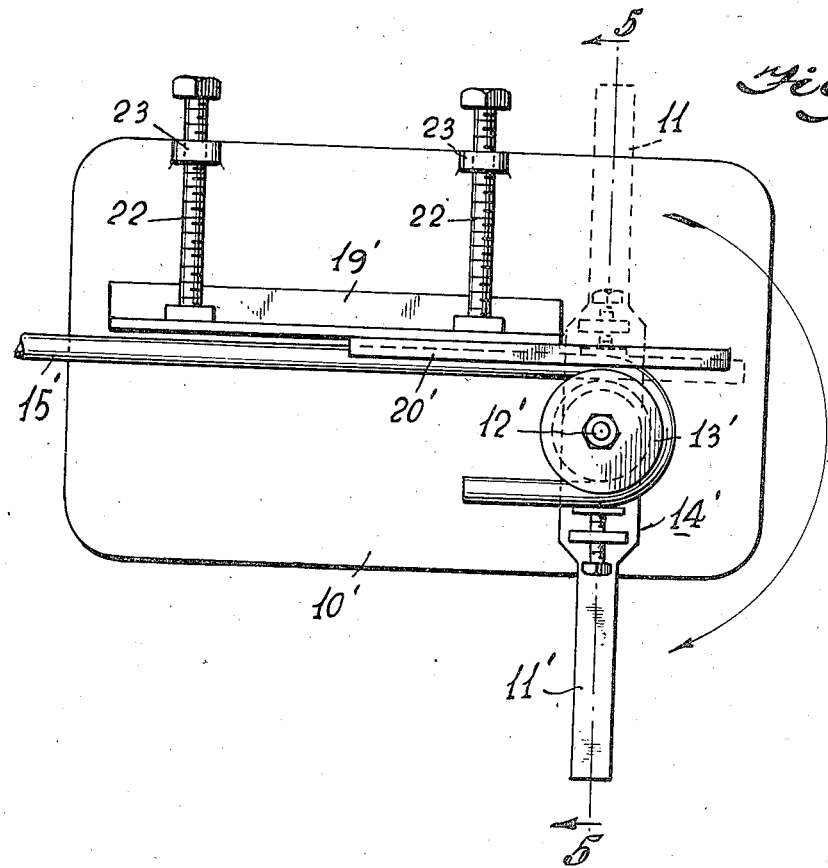
Fig. 4 is a top plan view of a machine constructed in accordance with another practical embodiment of the invention.

Referring to the drawings in detail, first to the form of the invention shown in Figs. 1 to 3, 10 designates the bed of the machine which may be in the form of a substantially rectangular plate of suitable length, width and thickness, and 11 designates a lever arm having one end portion thereof superimposed upon one end portion of said bed and suitably pivoted thereto, as indicated at 12, whereby the lever arm as a whole is swingable in a plane directly above and parallel to said bed.

Superimposed upon the lever arm 11 and suitably mounted in axial alinement with the pivot 12 thereof, is a wheel 13, while carried by said lever arm, adjacent to said wheel, is suitable means, designated generally as 14, for clamping a pipe, rod or the like 15 against said wheel.

The pivot 12 for the lever arm 11 may comprise a pin carried by and rising from the bed 10, and the wheel 13 may be mounted upon said pin. On the other hand, the means 14 may comprise a block 16 to engage the outer side of a pipe or rod 15 disposed against the wheel 13, a screw 17 engaged with said block, and a lug 18 rising from the lever arm 11 and having said screw threaded therethrough. In any event, when a pipe, rod or the like is clamped against the wheel 13 and the lever arm 11 is swung, the pipe, rod or the like will be constrained to move with said lever arm. In this connection it will be noted that the bed 10 is provided with means to hold the pipe, rod or the like against swinging outwardly relative to the wheel 13 when the lever arm 11 is swung. It is apparent, therefore, that swinging of said lever arm is effective to wrap the pipe, rod or the like about the wheel 13 and thus impart to the pipe, rod or a like a bend corresponding to the peripheral curvature of the wheel 13.

The holding means carried by the bed 10 may comprise a detachable abutment 19 rising from said bed and a member 20 in the form of a bar of suitable length engageable at its inner side with the pipe, rod or the like and slidably engaged at its outer side with said abutment 19. Thus, as the pipe, rod or the like is advanced longitudinally over the bed 10 responsive to wrapping of the same about the wheel 13 as the lever arm 11 is swung, the member 20 is free to move longitudinally therewith. Consequently, the pipe, rod or the like is not marred as might result from sliding of the same against the member 20 if the latter were stationary.

The faces of the wheel 13, the block 16 and the member 20 which engage the pipe, rod or the like may be, and preferably are, grooved to accommodate the pipe, rod or the like, and in this connection it will be noted that these elements may be interchangeable with other elements of the form but of different sizes to accommodate pipes, rods or the like of different diameters and to impart different bends thereto.

Preferably an abutment 19 and a related slide member is provided at each side of the bed 10 to adapt the machine for both right and left hand operation. Preferably, too, the abutments 19 are separate from the bed 10 and have, for example, dove-tail connections therewith, although they may be integral with or fixed to said bed if desired.

At the under side of and either integral with or fixed to the bed 10 is a bar 21 to adapt the machine to be mounted for operation in a bench vise or the like, as indicated in Figure 3 of the drawings.

Figure 5:
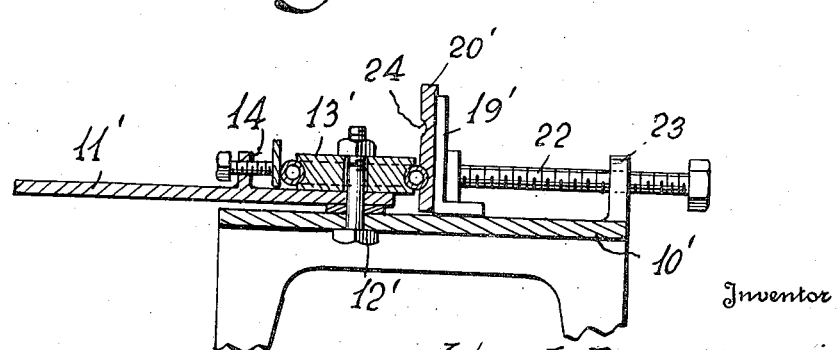
Fig. 5 is a section on the line 5—5 of Fig. 4.

Referring now to the Figures 4 and 5 form of the invention, the construction is essentially the same as the Figures 1 to 3 construction, except that it includes provision for adjusting the abutment 19' and the related slide member 20' toward and away from the wheel 13' to better adapt the machine to operate upon pipes, rods or the like of different diameters. In other words, the abutment 19', which may be in the form of an angle member as shown, rests upon the bed 10' and is shiftable inwardly and outwardly relative thereto and is held against outward movement from any given position thereof by screws 22 which are threaded in lugs 23 fixed to and rising from the bed 10'. Thus, by adjusting said screws, the lateral spacing of the abutment 19' from the wheel 13' may be varied so that pipes, rods or the like of different diameters may be accommodated between the slide member 20' and the wheels 13'.

In the use of the machine, the lever arm 11 or 11' is swung to a position as indicated by dotted lines in Figure 4, the pipe, rod or the like to be bent is disposed between the slide member 20 or 20' and the wheel 13 or 13', and is clamped against the wheel by the clamping means 14 or 14'. The lever arm 11 or 11' then is swung to wrap the pipe, rod or the like about the wheel 13 or 13', thereby imparting to it a bend corresponding to the circular or other peripheral contour of said wheel. As the bend is produced, the portion of the pipe, rod or the like which is engaged with the member 20 or 20' is advanced and said member is advanced therewith by sliding with respect to the abutment 19 or 19'.

Figure 5 illustrates that the slidable member 20' may have upper and lower pipe, rod or the like accommodating channels 24 of different sizes located so that said member may be reversed, top for bottom, to position either channel for use.

From the foregoing description considered in connection with the accompanying drawings, it is believed that the construction and operation of the present machine will be clearly understood and its advantages appreciated. It is desired to point out however, that while only certain specific structural embodiments of the invention have been illustrated and described, the same is readily capable of specifically different structural embodiments within its spirit and scope as defined in the claims.

I claim:

1. A pipe or rod bending machine comprising, a substantially rectangular flat base having front, rear and side edges, a lever arm superimposed upon said base and pivoted thereto adjacent said front edge for swinging movement thereover in a plane parallel thereto, a wheel superimposed upon said lever arm, means mounting said wheel in axial alinement with the pivoted axis of said lever arm, means carried by said lever arm for clamping a pipe or rod against the edge of said wheel, a vertically disposed detachable abutment member mounted upon said base along each of the side edges of the latter and tangentially with respect to said wheel, and a movable bearing means carried by the base adjacent each of the inner faces of each of said abutment members and engageable therewith, each of said bearing means being mounted for selective engagement with the outer face of a pipe or rod clamped to said wheel whereby said bearing means will move with a pipe or rod contacting therewith as the latter is bent in response to swinging movement of the lever away from the selected abutment and bearing means.

2. A pipe or rod bending machine comprising a substantially rectangular flat base having front, rear and side edges, a lever arm superimposed upon said base and pivoted thereto adjacent said front edge for swinging movement thereover in a plane parallel thereto, a wheel superimposed upon said lever arm, means mounting said wheel in axial alinement with the pivoted axis of said lever arm, means carried by said lever arm for clamping a pipe or rod against the peripheral face of said wheel, a vertically disposed detachable abutment formed for selective engagement along either of the side edges of said base and tangentially with respect to said wheel, and a movable bearing element mounted upon said base and slidably engaging the inner face of said abutment, whereby said bearing element will be engaged by a pipe or rod clamped to said wheel and will move therewith in response to bending movement of the lever in a direction away from said abutment and bearing element.

3. A pipe or rod bending machine in accordance with claim 2, wherein the side edges of the base and the detachable abutment are provided with cooperating connections of dovetail form.

JOHN J. DOUCETTE.

REFERENCES CITED

The following references are of record in the file of this patent:

UNITED STATES PATENTS

| Number | Name | Date |
|---|---|---|
| 83,522 | Miller | Oct. 27, 1868 |
| 588,223 | Fowler | Aug. 17, 1897 |
| 866,505 | Naysmith | Sept. 17, 1907 |
| 1,206,743 | Wheeler | Nov. 28, 1916 |
| 1,284,516 | Whitecotton | Nov. 12, 1918 |
| 1,330,026 | McIntosh | Feb. 3, 1920 |
| 1,662,131 | Schonfield | Mar. 13, 1928 |
| 1,901,762 | Meyer | Mar. 14, 1933 |
| 2,223,015 | Hathorn | Nov. 26, 1940 |

FOREIGN PATENTS

| Number | Country | Date |
|---|---|---|
| 596,692 | Germany | May 15, 1934 |